United States Patent [19]

Murakami et al.

[11] Patent Number: 4,552,262
[45] Date of Patent: Nov. 12, 1985

[54] ARTICLE FEEDING APPARATUS

[75] Inventors: Katsuhiko Murakami; Yoshio Iwamoto, both of Shiga, Japan

[73] Assignee: Kabushiki Kaisha Ishida Koki Seisakusho, Kyoto, Japan

[21] Appl. No.: 522,303

[22] PCT Filed: Jan. 13, 1983

[86] PCT No.: PCT/JP83/00012
§ 371 Date: Jul. 27, 1983
§ 102(e) Date: Jul. 27, 1983

[87] PCT Pub. No.: WO83/02407
PCT Pub. Date: Jul. 21, 1983

[30] Foreign Application Priority Data

| Jan. 19, 1982 | [JP] | Japan | 57-7315 |
| Jan. 19, 1982 | [JP] | Japan | 57-7316 |
| Jan. 19, 1982 | [JP] | Japan | 57-7317 |
| Jan. 19, 1982 | [JP] | Japan | 57-6153 |
| Jan. 19, 1982 | [JP] | Japan | 57-6154 |
| Jan. 20, 1982 | [JP] | Japan | 57-6852 |
| May 17, 1982 | [JP] | Japan | 57-72089 |
| May 17, 1982 | [JP] | Japan | 57-72090 |

[51] Int. Cl.$^4$ .............................................. B65G 47/26
[52] U.S. Cl. ..................... 198/447; 198/456; 198/384
[58] Field of Search .............. 198/447, 446, 445, 625, 198/456, 384, 703, 424, 433, 802, 706, 713, 714, 631, 458; 209/539, 912, 934, 698

[56] References Cited

U.S. PATENT DOCUMENTS

| 1,706,734 | 3/1929 | Hughes | 198/703 |
| 2,081,301 | 5/1937 | Hudspeth | 198/706 |
| 3,212,545 | 10/1965 | Anguilar | 198/384 |
| 3,250,372 | 5/1966 | Wagner et al. | 198/447 |
| 3,409,118 | 11/1968 | Meyer | 198/706 |
| 3,469,672 | 9/1969 | Stutske et al. | 198/458 |
| 3,535,847 | 10/1970 | Strohmeier et al. | 198/560 |

Primary Examiner—Joseph E. Valenza
Assistant Examiner—Kyle E. Shane
Attorney, Agent, or Firm—Armstrong, Nikaido, Marmelstein & Kubovcik

[57] ABSTRACT

An article feeding apparatus capable of reliably feeding articles one by one to the next process. It comprises a plurality of feed troughs (5) adapted to be individually vibrated and disposed side by side with each other with their take-in ends formed as flat surfaces in juxtaposed relation in a plane, a plurality of arranging conveyors (10) disposed adjacent the feed troughs in the direction of feed of articles, each conveyor serving to arrange articles in a line which are being fed from its associated feed trough and feed them, pool hoppers (14) installed at the take-out ends of the arranging conveyors and adapted to open and close, a bucket conveyor (15) for transferring to the next process the articles dropped from the pool hoppers one by one into buckets supported to turn around the axes of pivots, and means disposed at a predetermined position in the path of travel of the bucket conveyor for separating a plurality of articles from each other if such plurality are charged into a bucket. The feeding apparatus is very useful for sorting agricultural products for classification.

10 Claims, 12 Drawing Figures

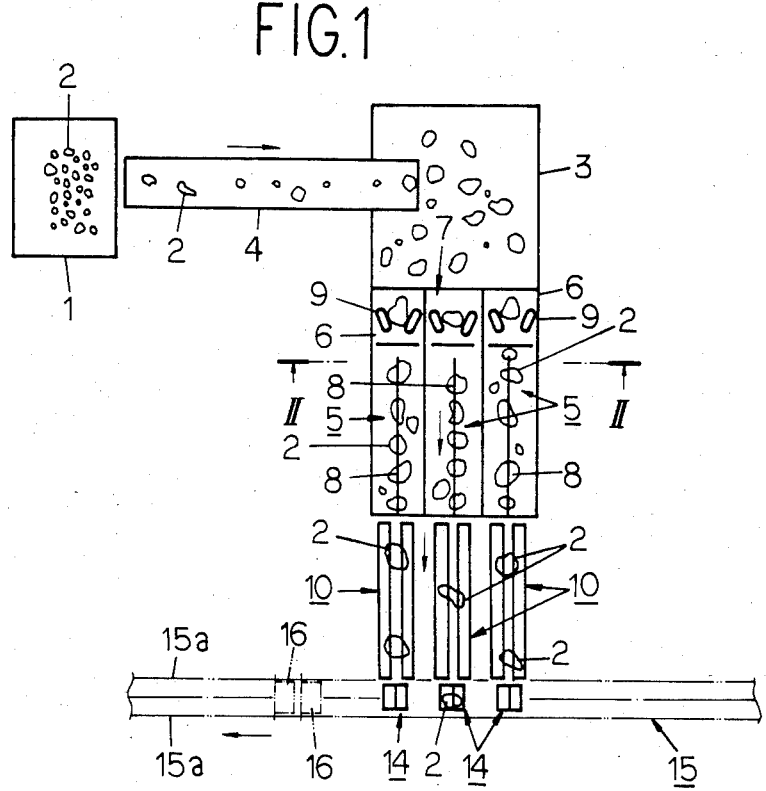

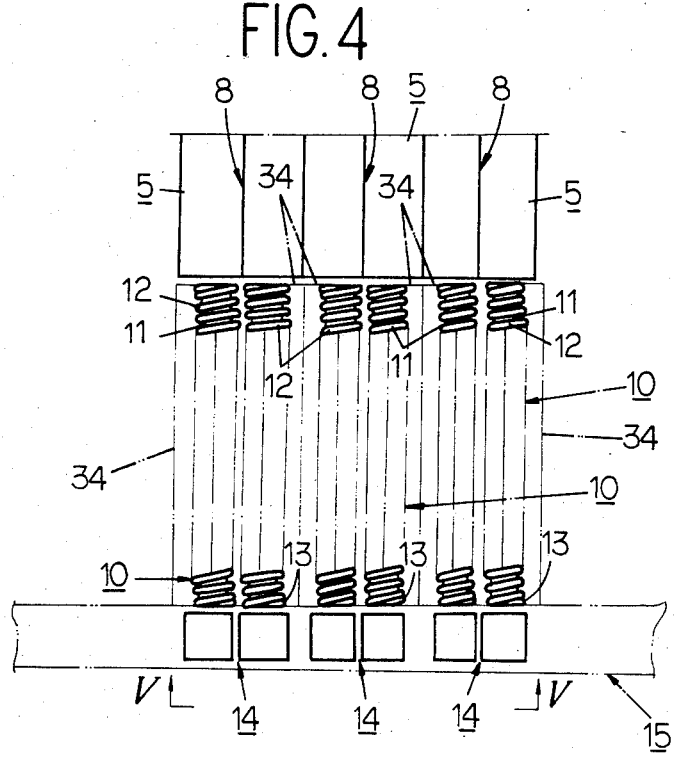
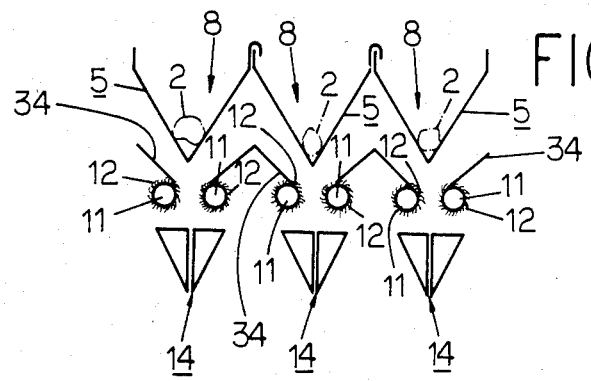

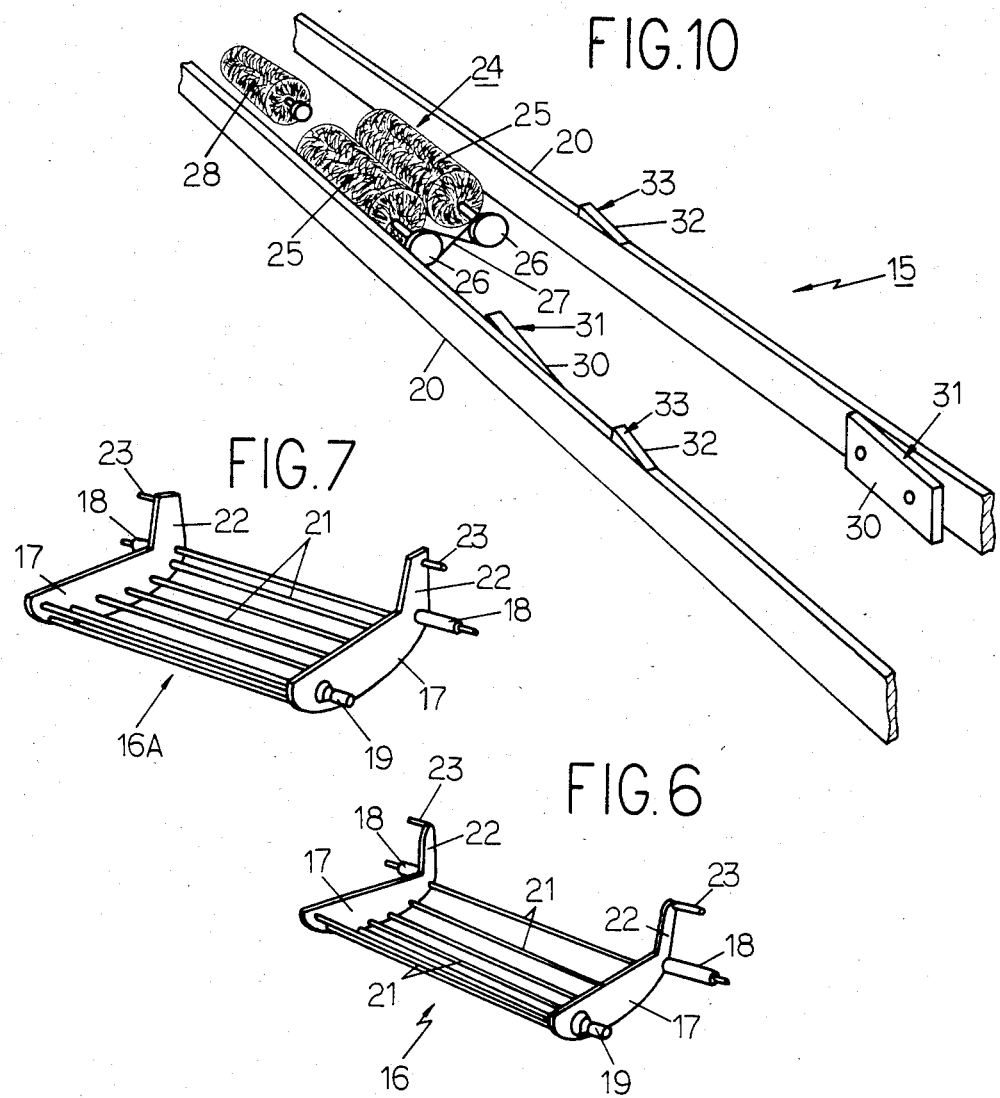

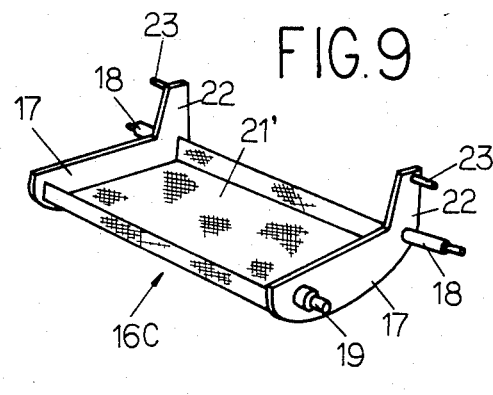
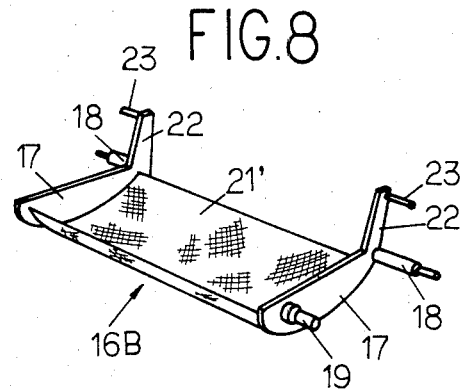
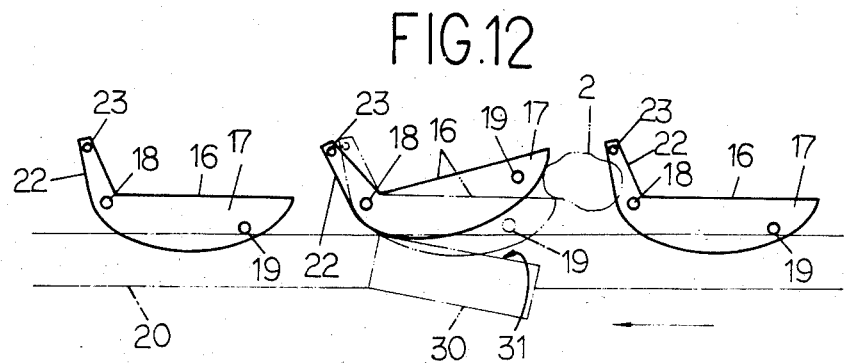
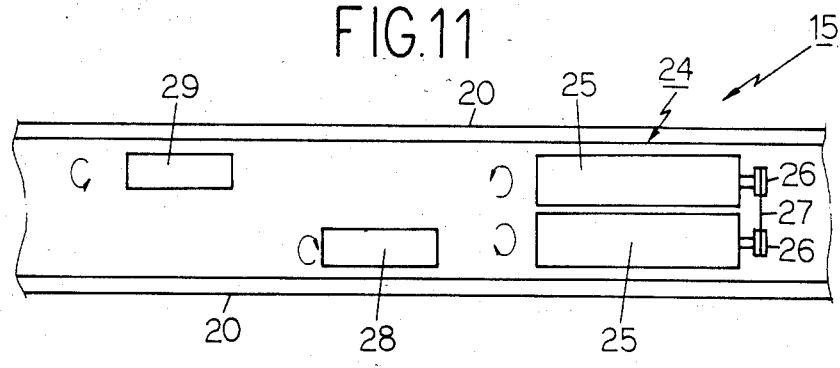

ARTICLE FEEDING APPARATUS

The present invention relates to an article feeding apparatus, particularly effective for use in sorting articles of different sizes, such as agricaltural and aquatic products, by size, and feeding them.

It is customary to sort agricultural and aquatic products, such as vegetables and fruits and fishes and shellfishes, by size, prior to shipping them to the market, and to this end, there has been used a sorting device equipped with a projected area measuring mechanism or the like. Such sorting devices are designed so that after the projected areas of articles are measured one by one, the articles are sorted on the basis of the measured values and then fed to the next process. To achieve this object, it is required that before articles are fed to the sorting device, they be put in ordered arrangement for accurate measurement of projected areas and that the articles being continuously fed be maintained with a suitable distance therebetween which is needed for individual measurement of projected areas. Among the conventional devices, however, none have been found which are capable of satisfactorily performing the function of retaining a required distance between articles to be measured; thus, they have been very poor in article sorting efficiency.

A principal object of the present invention is to provide an article feeding apparatus which is capable of eliminating the aforesaid drawback found in the conventional apparatuses.

To this end, an apparatus according to the invention comprises a plurality of feed troughs adapted to be individually vibrated and disposed side by side with each other with their take-in ends formed as flat surfaces in juxtaposed relation in a plane, a plurality of arranging conveyors parallel with each other and each being effective to cause articles being fed thereon from its associated feed trough to pass therealong in a line, pool hoppers disposed at the take-out ends of the arranging conveyors and adapted to open and close, a bucket conveyor for feeding to the next process the articles dropped from the pool hoppers one by one into buckets supported to turn around the axes of pivots, and means dispersed at a predetermined position in the path of travel of the bucket conveyor and designed so that even if a plurality of articles are dropped into a bucket, they can be separated thereby, the arrangement being such that only a single article dropped into a single bucket can be fed to the next process.

The described and other objects and features of the present invention will become more apparent from the following description to be given with reference to the accompanying drawings; in which FIG. 1 is a schematic plan view of an apparatus of this invention;

FIG. 4 is an enlarged view of a portion of FIG. 1, showing arranging conveyors and pool hoppers;

FIG. 5 is a schematic view taken in the direction of the line V—V in FIG. 4;

FIGS. 6–9 are perspective views of various forms of bucket;

FIG. 10 is a perspective view of article separating means and bucket conveyor rails;

FIG. 11 is a diagrammatic plan view of the article separating means; and

FIG. 12 is a schematic side view illustrating the action of the bucket conveyor.

Figure 3:
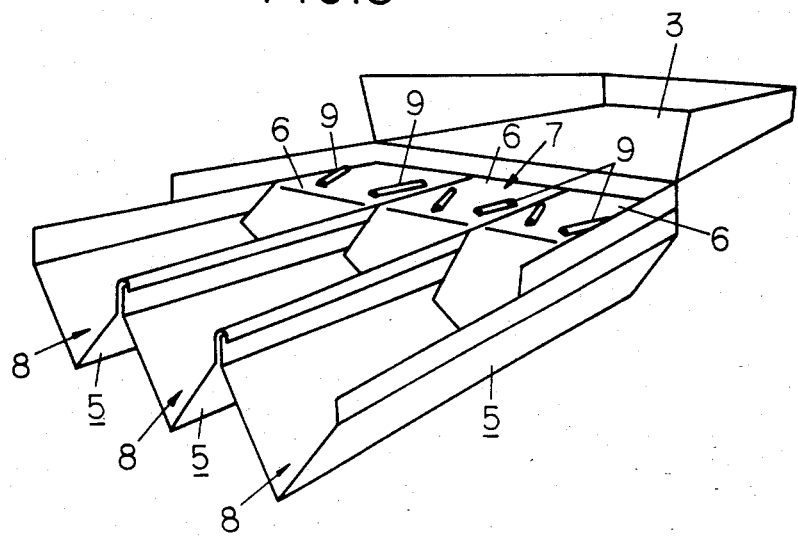
FIG. 3 is a perspective view of the feed troughs.

An embodiment of the present invention will now be described with reference to the drawings wherein the invention is embodied in an article feeding apparatus with a sorting mechanism, in which potatoes dropped into buckets are imagewise treated by a television camera to compute their areas and are sorted on the basis of the areas into, for example, Class S(small size), Class M (medium size) and Class L (large size).

In FIG. 1, the numeral 1 denotes a container for collecting potatoes 2; 3 denotes a feed table adapted to be vibrated by a suitable means disposed above the level of the container 1 so as to impart articles thereon advance movement; and 4 denotes a transfer conveyor disposed in an inclined bridge fashion between the container 1 and the feed table 3. The article feeding apparatus of this invention comprises a plurality of feed troughs 5 for receiving articles, namely potatoes 2, from the feed table 3 and individually feeding them, arranging conveyors 10 each serving to arrange potatoes in a line which are being fed from the associated feed trough 5, pool hoppers 14 for receiving potatoes from the arranging conveyors 10 and dropping them one by one, a bucket conveyor 15 for receiving potatoes from the pool hoppers 14 and transferring them to the next process, and separating means 24 for separating a plurality of potatoes if such plurality are charged into the same bucket on the bucket conveyor 15.

Figure 2:
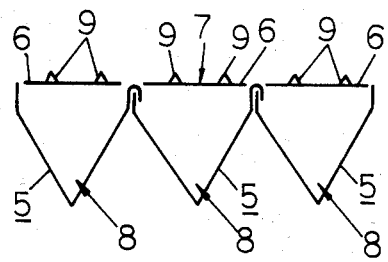
FIG. 2 is a sectional view taken along the line II—II in FIG. 1, schematically showing feed troughs.

The plurality of feed troughs 5, as shown in FIGS. 2 and 3, are disposed side by side at one side of the feed table 3 so that the take-in ends 6 do not contact the feed table 3, and they are individually supported so that they can be individually vibrated by electromagnetic vibrators (not shown). Each feed trough 5 comprises the take-in end 6 which, disposed side by side with those of the other feed troughs, forms one of flat surfaces 7 in a plane, and a transfer passage 9 of V-shaped cross section. Each take-in end 6 has ridges 9 formed thereon in nonparallel arrangement.

In addition, it is possible to provide an optical sensor (not shown) which consists of a light projector and a light receiver which are positioned on both sides of the flat surfaces 7 to detect the amount of the staying potatoes so as to control the amount of the potatoes being fed from the feed table 3 to the feed troughs 5.

Each arranging conveyor 10, as shown in FIGS. 4 and 5, includes a pair of parallel rotary shafts 11 having brushes 12 spirally wound thereon and rotatably supported by a suitable drive means. The direction of winding of the spiral brushes 12 and the direction of rotation of the rotary shafts 11 are such as to give potatoes 2 received from the feed troughs 5 a fixed direction of transfer extending from the feed troughs 5 toward the pool hoppers 14. Further, each brush 12 is provided with a guide plate 34 extending longitudinally of the brush 12 to cover approximately half the upper outer region. The guide plates 34 are upwardly inclined at an angle of about 45° with respect to the rotary shafts 11, with their lower ends contacting the brushes 12. These guide plates 34 prevent potatoes 2 from falling sideways off the arranging conveyors 10. More particularly, a pair of rotary shafts 11 disposed adjacent and parallel to each other to form a pair of arranging conveyors 10 have brushes 12 wound thereon all, e.g., clockwise, so that by rotating the rotary shafts all in a clockwise direction as viewed from the take-out ends, it is possible to transfer potatoes 2, which are being fed from the feed troughs 5, into the pool hoppers 14.

The pool hoppers 14, as can be seen from FIG. 5, are installed below the take-out ends of the arranging conveyors 10 and are actuated by a cam mechanism to open and close. An optical sensor (not shown) consisting of a light projector and a light receiver is installed at the take-out end of each arranging conveyor 10. When the optical sensor detects passage of a potato 2 from the arranging conveyor 10 to the pool hopper 14, the arranging conveyor 10 stops its operation, while the charging of potatoes 2 from the pool hoppers 14 into the buckets 16 on the bucket conveyor 15 is effected timely by a cam mechanism (not shown). From which pool hopper 14 into which bucket 16 a potato 2 is to be charged is predetermined, and it is so arranged that after a pool hopper 14 is opened and a potato 2 is charged into a bucket 16, the pool hopper 14 is closed, whereupon the arranging conveyor 10 is driven again.

A potato 2 fed into a pool hopper 14 is dropped into a bucket 16 carried on the bucket conveyor 15 traveling immediately below the pool hopper and transferred to a projected area measuring process using imagewise treatment. Measurement of projected areas by imagewise treatment is based on the assumption that a single article, which, in this case, a potato 2, to be measured is received in a single bucket 16. Thus, potatoes are sorted by size on the basis of their projected areas. To this end, it is necessary for the arranging conveyors 10 and pool hoppers 14 to have a construction which prevents two or more potatoes 2 from falling simultaneously into the same bucket 16.

For this reason, in a preferred embodiment of the invention, the transfer speed of the arranging conveyors 10 is greater than that of the feed troughs 5 so that potatoes 2 may be arranged at suitable intervals of space on the arranging conveyors 10.

For a similar purpose, at least one of the pair of brushes 12 constituting each arranging conveyor 10 is formed with a weir portion 13 of larger diameter on its terminal end adjacent to the pool hopper 14 so as to increase the relative contact speed between the brush and potatoes at that portion to thereby impart a greater speed to a first potato than a second one which follows it when potatoes 2 fall into the pool hopper 14, thus ensuring that potatoes 2 fall one by one with each potato separated from the following one. In addition, the weir portions 13 also serve as safety members for preventing potatoes from accidentally rolling off the path.

An unillustrated optical sensor including a light projector and a light receiver is positioned adjacent each weir 13 to detect passage of potatoes 2 arranged at suitable intervals of space, and the detection by the optical sensor is utilized to start and stop the rotation of the brushes 12 so as to provide the spacing between adjacent potatoes.

As another embodiment, it is also possible to obtain the same spacing effect by gradually increasing the spiral angle of the spiral brushes 12 from the article inlet side toward the article outlet side.

The bucket conveyor traveling immediately below the pool hoppers 14 is at right angles to the arranging conveyors 10. The bucket conveyor 15 comprises a pair of continuously driven endless chains 15a, buckets 16 each having opposed lateral plates 17, pivot pins 18 projecting from predetermined portions of the lateral plates, the pivot pins being pivotally supported on the endless chains, the number of buckets 16 being a multiple of the number of pool hoppers 14, the buckets 16 being carried at equal intervals on the pair of endless chains, guide pins 19 respectively projecting from the front ends of the lateral plates 17, and a pair of guide rails 20 extending parallel with the endless chains, the guide pins being placed on the guide rails, the arrangement being such that when the endless chains 15a are traveling, the buckets 16 move in substantially horizontally supported condition with the guide pins 19 sliding on the rails 20, and when the guide pins 19 leave the rails 20 at the predetermined position, the buckets are turned downward around the axes of the pivot pins 18.

The bucket 16, as shown in FIG. 6, has an arcuate bottom formed of a plurality of thin wires 21 parallelly equispaced and extending between and fixed to the lateral plates 17. Further, when the guide pins 19 of the bucket 16 reach the railless region and come off the rails 20 to allow the bucket to turn downward around the axes of the pivot pins 18, control pins 23 projecting from projecting pieces 22 on the lateral plates 17 strike against the rails 20 to utilize the striking force to release potatoes of, e.g., elongated shape which have stuck between the wires 21, while limiting the turning angle of the bucket 16 to a predetermined value.

A somewhat modified bucket 16A shown in FIG. 7 has a flat bottom formed of a plurality of thin wires 21 parallelly equispaced and extending between and fixed to lateral plates 17. Such flat bottom of the bucket is advantageous. For example, even potatoes of elongated shape, such as the species May Queen, when placed on an arcuate bottom, tend to tilt, but the flat bottom prevents this, enabling correct computation of their projected areas; thus, area computation error becomes zero. A further modified bucket 16B shown in FIG. 8 has an arcuate bottom formed of a net-like member 21' installed between the lateral plates 17. As for the material of the net-like member 21', wires, strings, integrally molded plastics or any other suitable material may be used. In addition, the bottom of the bucket may be flat as in a further modification 16C shown in FIG. 9.

Since the bottoms of the buckets 16, 16A, 16B, and 16C are formed of thin wires 21 or a net-like member 21', as described above, they allow passage of light therethrough for area computation of potates by imagewise treatment and there is no possibility of the bottoms affecting area computation of potatoes. Further, front ends of rotary brushes constituting article separating means 24 to be presently described penetrate between the wires or into the net-like member to contact the potato in the bucket and move it within the bucket by the frictional force.

The article separating means 24 shown in FIGS. 10 and 11 is installed at a predetermined position in the path of travel of the bucket conveyor 15 to separate a plurality of potatoes if such plurality are charged into a bucket 16. It comprises a pair of separating brushes 25 supported symmetrically on both sides of the centerline of the bucket conveyor 15 by suitable means, and a belt 27 crosswise entrained around pulleys 26 on the shaft ends of the separating brushes to rotate the separating brushes 25 respectively in the outward direction. The numerals 28 and 29 denote separating brushes spaced apart from each other toward the opposite sides of the centerline of the bucket conveyor 15 and also longitudinally, the separating brushes being of the same construction as the aforesaid brushes 25 and being rotated respectively in the inward direction.

A bucket shaking mechanism will now be described with reference to FIGS. 10 and 12. Plates 30 upwardly sloping in the direction of travel are attached to the inner surfaces of the rails 20 at predetermined positions, so that when the buckets 16 of the bucket conveyor 15 move in the direction of arrow in FIG. 12, the lower ends of the lateral plates 17 of the buckets 16 slide along the inclined surfaces 31 of upward slope of the plates 30 and hence the rear ends of the buckets 16 are raised. Thus, the spacing between adjacent buckets 16 is increased, so that even if there is a potato intervening between adjacent buckets 16, it can be dropped and discharged. Further, members 32 arranged on the upper surfaces of the rails 20, e.g., in a zigzag pattern and having an inclined surface 33 of upward slope vertically shake each bucket 16 one side at a time, whereby a potato 2 dropped to one side in the bucket and placed there is moved to the central region of the bucket and thus positioned within the range of imagewise treatment.

The operation of the embodiment will now be described.

Potatoes 2 in the container 1 are placed on the transfer conveyor 4 to feed them to the feed table 3. The potatoes 2 thus fed to and collected on the feed table 3 are fed to and collected on the flat surfaces 7 of the feed troughs 5 by vibrating the feed table 3. It is so arranged that when the amount of potatoes 2 collected on the flat surfaces 7 falls below a fixed level, the feed table 3 is driven in response to a signal from, e.g., the aforesaid optical sensor so as to ensure that an amount of potatoes below the fixed level are always collected on the flat surfaces 7. The feed troughs 5 are individually vibrating, but if one or more of the feed troughs 5 stop vibration, since the take-in ends 6 of the feed troughs 5 are continuous with each other to define the flat surfaces 7, potatoes 2 move from the take-in ends 6 of the stopped feed troughs 5 to the take-in ends 6 of the vibrating feed troughs 5, so that the potatoes 2 are scattered rather than collected at particular places and hence the feeding of the potatoes 2 is smoothly effected. Since the feed troughs 5 are vibrated by the electromagnetic vibrators so as to impart articles thereon advance movement, the potatoes 2 fed to the flat surfaces 7 of the feed troughs 5 are dropped from the flat surfaces 7 onto the V-shaped transfer passages 8 and they are then gradually transferred along the transfer passages toward the front ends, from which they are successively fed onto the arranging conveyors 10.

Since each arranging conveyor 10 has its pair of rotary shafts 11 rotated, e.g., on a clockwise direction as viewed from the take-out end and since the rotary shafts 11 have brushes 12 spirally wound thereon, e.g., clockwise, the potatoes 2 are propelled in linearly ordered arrangement on the arranging conveyors 10 along the brushes 12 toward the front ends, with the guide plates 34 preventing the potatoes from dropping sideways off the arranging conveyors 10. Thus, they are charged from the front ends into the pool hoppers 14 now closed. When they are charged into the pool hoppers 14, the optical sensors installed at the take-out ends of the arranging conveyors 10 detect passage of potatoes 2, so that the corresponding arranging conveyor or conveyors 10 stop driving. At this time, even if a potato 2 tends to fall from the arranging conveyor 10 into the pool hopper 14, since at least one of the brushes 12 is of larger diameter, this weir 13 of larger diameter prevents the potato 2 from inadvertently falling into the pool hopper 14. Further, the increased peripheral speed of the brush given by the weir 13 of larger diameter, i.e., the article delivery speed, prevents continuous falling of potatoes 2. In this way, potatoes 2 are dropped one by one into each pool hopper 14.

When a potato 2 is thus dropped into a pool hopper 14 now closed, the pool hopper 14 is opened by the cam mechanism in timed relation to the movement of the buckets 16 of the bucket conveyor 15 which is constantly rotating, whereby the potato 2 is charged into a predetermined bucket 16.

The potato 2 charged into the bucket 16 is fed to the next process with the movement of the bucket conveyor 15. During this travel, the bucket 16 is vertically shaken, one end at a time, alternately by the members 32 fixed on the rails 20. Thus, even if the potato 2 is being transferred partly projecting outside over a lateral plate 17 of the bucket 16, it is moved to the central region, so that there will be no trouble to computation of the area of the potato 2 by imagewise treatment. Further, if a potato 2 falls to a space between adjacent buckets 16 of the bucket conveyor 15, as shown in FIG. 12, since the buckets 16, when moving in the direction of arrow in FIG. 12, have their lateral plates 17 slid along the inclined surfaces 31 of the plates 30, the buckets are naturally turned upward around the axes of the pivot pins 18 and hence their rear ends are raised to allow the potato 2 intervening between the buckets 16 to drop downward.

Further, if a plurality of potatoes 2 are charged into a moving bucket 16, it is necessary to separate them from each other if they are contacted with each other, since, if not, they would be judged to be a single potato when their areas are computed. Since the bottom surface of each bucket 16 is formed of a plurality of wires 21 or a net 21', as previously described, the separating brushes 25, 28 and 29 disposed in the path of travel of the buckets come in contact with the potatoes 2 in the bucket 16. Where the plurality of potatoes 2 are in the central region of the bucket, they are separated from each other by the separating brushes 25 rotating respectively in the outward direction, and where a plurality of potatoes 2 are adjacent to one lateral side of the bucket 16, one potato 2 is moved inward by the separating brushes 28 and 29 rotating in the inward direction. When the presence of a plurality of potatoes in single bucket 16 which are thus separated from each other is found at the time of imagewise treatment, these potatoes are judged to be rejects and instead of being transferred to the classification sorting device or to the packaging device, they are transferred to a separate bypass passage.

In the next process, the guide pins 19 of the bucket 16 are disengaged from the rails 20 to allow the bucket 16 to turn downward around the axes of the pivot pins 18 to thereby discharge the potato 2. However, if the potato 2 is held between wires 21, the control pins 23 strike against the rails 20 when the bucket 16 turns downward, so that the striking force releases the potato 2 in the bucket 16 from between the wires 21 to allow it to fall to the next process.

While the present invention has been described as being applied to a feeding apparatus for or sorting agricultural products, particularly potatoes, for classification, the invention is not limited thereto and it can be used as an apparatus for feeding articles in lump form. Of course, it can also be used as an article feeding apparatus for other purposes than classification of articles.

What is claimed is:

1. An article feeding apparatus comprising:
   (a) a plurality of feed troughs disposed side by side with each other with their take-in ends formed as flat surfaces in juxtaposed relation in a plane;
   (b) a plurality of arranging conveyors parallel with each other and each being effective to cause articles being fed thereon from its associated feed trough to pass therealong in a line;
   (c) pool hoppers disposed at the take-out ends of said arranging conveyors and adapted to open and close;
   (d) a bucket conveyor for feeding to the next process the articles dropped therein from said pool hoppers one by one, said buckets supported to turn around the axes of pivots; and
   (e) article separating means disposed at a predetermined position in the path of travel of the buckets of said bucket conveyor and adapted to separate a plurality of articles from each other if such articles are charged into a bucket, said article separating means including at least one rotary brush with the tips of its bristles penetrating members forming the bottom of said bucket.

2. An article feeding apparatus comprising:
   (a) a plurality of feed troughs disposed side by side with each other with their take-in ends formed as flat surfaces in juxtaposed relation in a plane;
   (b) a plurality of arranging conveyors parallel with each other and each being effected to cause articles being fed thereon from its associated feed trough to pass therealong in a line, each of said arranging conveyors comprising a pair of article separating brushes parallelly extending in the direction of feed of articles and supported for rotation, said article separating brushes being spirally wound to give a fixed direction of transfer to said articles;
   (c) pool hoppers disposed at the take-out ends of said arranging conveyors and adapted to open and close;
   (d) a bucket conveyor for feeding to the next process the articles dropped therein from said pool hoppers one by one, said buckets supported to turn around the axes of pivots; and
   (e) article separating means disposed at a predetermined position in the path of travel of the buckets of said bucket conveyor and adapted to separate a plurality of articles from each other if such a plurality is charged into a bucket.

3. An article feeding apparatus as set forth in claim 2, wherein at least one of the terminal ends of said spiral brushes is formed with a weir portion of larger diameter.

4. An article feeding apparatus comprising:
   (a) a plurality of feed troughs disposed side by side with each other with their take-in ends formed as flat surfaces in juxtaposed relation in a plane;
   (b) a plurality of arranging conveyors parallel with each other and each being effective to cause articles being fed thereon from its associated feed trough to pass therealong in a line;
   (c) pool hoppers disposed at the take-out ends of said arranging conveyors and adapted to open and close;
   (d) a bucket conveyor for feeding to the next process the articles dropped therein from said pool hoppers one by one, said buckets supported to turn around the axes of pivots, wherein said buckets are carried at equal intervals on a pair of endless chains driven by suitable means, and the bottom surfaces of said buckets are formed of a plurality of wires extending parallel between the opposed lateral plates of each bucket; and
   (e) article separating means disposed at a predetermined position in the path of travel of the buckets of said bucket conveyor and adapted to separate a plurality of articles from each other if such a plurality is charged into a bucket, said article separating means including at least one rotary brush with the tips of its bristles penetrating between the wires.

5. An article feeding apparatus as set forth in claim 4, wherein the bottom surface of the bucket is flat.

6. An article feeding apparatus as set forth in claim 4, wherein the bottom surface of the bucket is arcuate.

7. An article feeding apparatus comprising:
   (a) a plurality of feed troughs disposed side by side with each other with their take-in ends formed as flat surfaces in juxtaposed relation in a plane;
   (b) a plurality of arranging conveyors parallel with each other and being effective to cause articles being fed thereon from its associated feed trough to pass therealong in a line;
   (c) pool hoppers disposed at the take-out ends of said arranging conveyors and adapted to open and close;
   (d) a bucket conveyor for feeding to the next process the articles dropped therein from said pool hoppers one by one, said buckets supported to turn around the axes of pivots, said buckets being carried at equal intervals on a pair of endless chains driven by suitable means, the bottom surfaces of said buckets being formed by installing a net-like member of suitable material between the opposed lateral plates of each bucket; and
   (e) article separating means disposed at a predetermined position in the path of travel of the buckets of said bucket conveyor and adapted to separate a plurality of articles from each other if such a plurality is charged into a bucket, said article separating means including at least one rotary brush with the tips of its bristles penetrating into the net-like member forming the bottom surface of the buckets.

8. An article feeding apparatus as set forth in claim 7, wherein the bottom surface of the bucket is flat.

9. An article feeding apparatus as set forth in claim 7, wherein the bottom surface of the bucket is arcuate.

10. An article feeding apparatus as set forth in claim 4 or 7, wherein guide pins projecting from the outer surfaces of the lateral plates of each bucket at predetermined positions are slidably placed on rails installed in parallel to said endless chains, and members for slide contact with the buckets are fixed to the inner surfaces of said rails at predetermined positions so that they slope upward in the direction of travel of the buckets.

* * * * *